United States Patent Office 3,740,355
Patented June 19, 1973

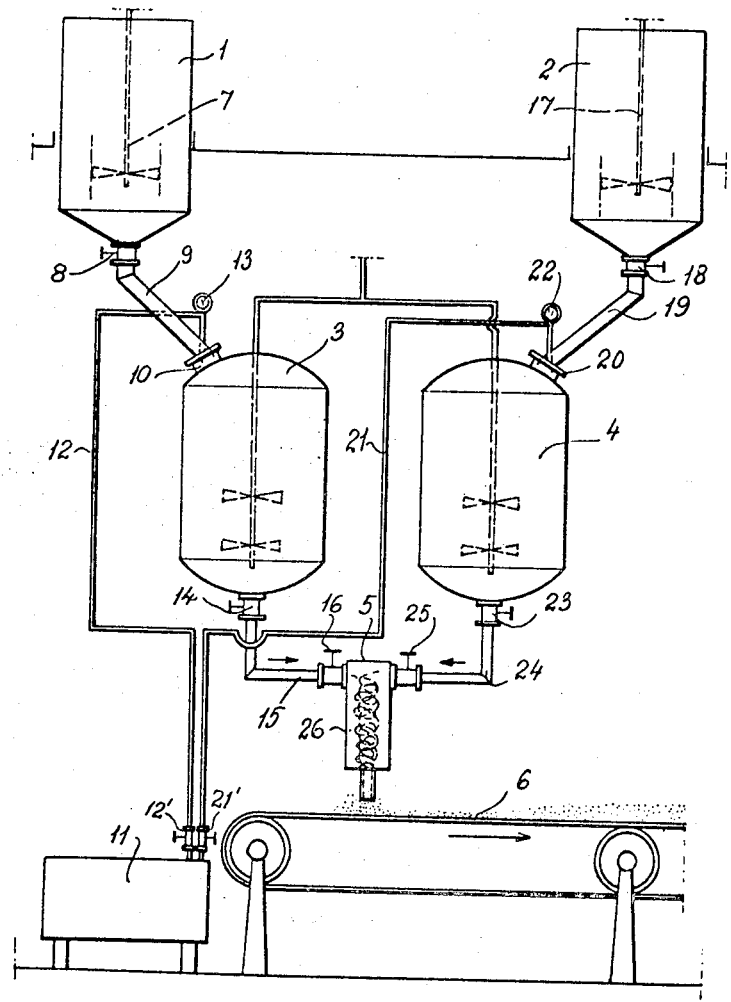

3,740,355
METHOD OF PREPARING BODIES ON THE BASIS OF UREA-FORMALDEHYDE RESINS
Walther H. Klug, Stockholm, Sweden, assignor to PGC Scientifics Corporation, Rockville, Md.
Continuation of abandoned application Ser. No. 22,855, Mar. 26, 1970. This application Dec. 20, 1971, Ser. No. 210,153
Claims priority, application Sweden, Nov. 28, 1969, 16,469/69
Int. Cl. C08j 1/16
U.S. Cl. 260—2.5 FP                10 Claims

ABSTRACT OF THE DISCLOSURE

A method of preparing foamed bodies on the basis of urea-formaldehyde resins. This is accomplished by feeding separately and continuously a first component comprising a neutral or alkaline aqueous solution of a urea-formaldehyde precondensate containing a small addition of a sulfite waste liquor, and a second component comprising an aqueous solution of an acid hardener such as phosphoric acid, and a foaming agent such as an alkyl aryl sulfonate, into a mixing zone, injecting compressed air into the resulting mixture to provide a foamed mass, discharging the mass through a nozzle means connected to the mixing zone, and allowing the mass to cure. To compensate for an after-shrinkage in connection with the curing, a small amount of chalk is added to the aqueous solution of the urea-formaldehyde precondensate. An incombustible product is obtained by incorporating into the aqueous solution of the urea-formaldehyde precondensate a minor amount of copper phthalocyanine.

---

This is a continuation of application Ser. No. 22,855, filed Mar. 26, 1970 and now abandoned.

BACKGROUND OF THE INVENTION

This invention relates to the production of expanded or foamed plastics. More particularly, it relates to a method of preparing foamed bodies on the basis of urea-formaldehyde resins.

From the German Pat. No. 734,094 a method is known for the preparation of insulating masses by foaming aqueous solutions of thermosetting urea-formaldehyde precondensates and curing of the foam. According to this method, an aqueous solution of a urea-formaldehyde precondensate and an aqueous solution of a foaming agent (such as naphthalene sulfonic acid) are foamed or sprayed into separate vessels with pressurized gases whereupon the foamed or atomized resinous solution is mixed with the foam, the foamed mass being thereafter subjected to curing under acid conditions. In the patent reference is not made to the physical properties of the foamed body or its possible fire-retarding or fire-resistive quality. It is well known, however, that foamed bodies of urea-formaldehyde resins are brittle and possess a poor durability, especially in an acid environment. Especially when the foamed precondensate is cured by the use of a pH lowering agent, there is always a great risk that after a longer or shorter period of time the cured resin is chemically degraded so that the foam structure is weakened and the material may even disintegrate into a powder. A further inherent disadvantage of known bodies of expanded urea-formaldehyde resins is their inflammability for which reason, despite their virtually good insulating properties, they are not allowed to be used in cases where demands on non-inflammability of the resin are made. Certainly they are self-extinguishing, i.e., when directing a flame against the surface of the foamed resin until the material begins burning and the flame is thereafter removed, the flames which have begun to flare up from the surface of the resin will expire. When heated without a free flame being directed against the material, at temperatures from 300° C. it starts charring and at temperatures of up to 700–800° C. the material is decomposing at an increased rate under evolution of combustible gases, mainly carbon monoxide.

It is therefore the principal object of this invention to provide a method for preparing from urea-formaldehyde resins, foamed bodies having improved physical properties and improved durability.

Another object is to provide a process of preparing bodies of foamed urea-formaldehyde resins, which are completely incombustible and possess improved physical properties and improved durability.

SUMMARY OF THE INVENTION

According to the present invention foamed bodies of urea-formaldehyde resin having improved physical properties and improved strength and durability are produced by a method wherein a first component comprising a neutral to alkaline aqueous solution containing 30 to 50 weight percent of a urea-formaldehyde precondensate having a molar formaldehyde to urea ratio of between 1.8:1 and 2.2:1, and 10–20 ml./l. of an aqueous solution containing 50 weight percent of sulfite waste liquor on a dry basis; and a second component comprising an aqueous solution containing 6 to 15 weight percent of phosphoric acid or an equivalent amount of another conventional acid catalyst or hardening agent such as formic or oxalic acid, and 2 to 8 weight percent of a foaming agent consisting of an alkyl or aryl or alkyl aryl sulfonate, are fed separately, and with a proportion between the feed rates of said first and second components of between 2:1 and 1:1, into and mixed in a confined mixing zone having a nozzle means connected thereto, and wherein the mixture is foamed and the resulting foam ejected through the nozzle means under expansion of the foam and subsequent setting thereof.

In a preferred embodiment of the invention the first solution contains 36 weight percent urea-formaldehyde precondensate having a molar formaldehyde to urea ratio of 2.1:1, and 13 ml./l. of a 50 percent by weight sulfite waste liquor with calcium or ammonium as the base, and the second solution contains 7.65 weight percent of 100% phosphoric acid (corresponding to 9 weight percent of 85% phosphoric acid of commercial grade), and 2.0 weight percent of a foaming agent consisting of a sulfonation product of vegetable fats, mainly of the palm oil type, said solutions being mixed continuously in a proportion between the feed rates of the first and second solutions of 1:0.75.

In accordance with the method described, foamed bodies having apparent densities from 5 kg./m.$^3$ upwards, such as 40 kg./m.$^3$, may be produced, although the later value is not to be deemed as an absolute upper limit for the possibilities of the method. Because of the larger weight and the increased consumption of materials and the resulting increased costs, larger densities are of less interest, however. According to the preferred embodiment described above, foamed bodies having an apparent density of about 16 kg./m.$^3$ are obtained.

For extending and/or additional stabilizing the foamed bodies fillers or extenders known in the art such as, for instance, glass fibers, quartz powder, mineral fibers, asbestos, may be added to the resinous solution.

To compensate for an after-shrinkage in connection with the curing of the foamed mass, a small amount such as, for instance, 1–5 weight percent, preferably 3 weight percent, of calcium carbonate may be added to the resinous solution. In this case, an acid substance in an amount equivalent to the amount of chalk has to be added to the solution of the acid hardener in excess of the amount of acid required for curing the foamed plastic. When after completion of the pouring the foamed mass is becoming gelatinized and cured, the chalk will react with the acid under evolution of carbon dioxide which brings about an expansion resulting in a bursting of closed gas bubbles so that a more or less open porous structure is obtained.

As acid catalysts or hardening agents it is possible instead of phosphoric acid to use other acids such as, for example, formic or oxalic acid, etc.

In the present method it is essential that the resinous solution and the solution of the acid hardening agent be mixed immediately before the resulting mass is foamed and poured, since after addition of the hardening agent the urea-formaldehyde precondensate will have a very short gelatination time before the curing process sets in.

In comparison with foamed urea-formaldehyde resin products previously known the foamed bodies prepared in accordance with the invention possess superior physical properties and substantially improved durability. This is due to the surprising discovery that the addition of very small but critical amounts of sulfite waste liquor to the resinous solution will exert a stabilizing effect on the foam structure. While the reasons for this phenomenon are not known, they could at least in part be ascribed a plasticizing effect on the urea-formaldehyde resin.

According to the invention it has further been found that a completely incombustible foamed urea-formaldehyde resin body may be produced by adding to the aforementioned resinous solution of said urea-formaldehyde precondensate with an admixture of sulfite waste liquor, copper phthalocyanine in an amount of 0.01 to 0.1 percent, preferably 0.03 percent by weight of the urea-formaldehyde precondensate on a dry basis. By way of introduction it was mentioned that on heating to an elevated temperature a urea-formaldehyde resin is decomposed under evolution of combustible gases, mainly carbon monoxide. Quite unexpectedly it has been found, however, that a foamed body according to the invention, in the preparation of which copper phthalocyanine has been mixed into the resinous solution in an amount within the range set forth above, upon charring does not give off any combustible gases whatever. It has not been possible to establish how the copper phthalocyanine is capable of exhibiting this surprising action, which is extremely desirable from the point of view of fire protection. However, the reason thereof might be ascribed a catalytic oxidation of carbon monoxide to carbon dioxide in the presence of the air oxygen, the presence of which has proved to be necessary to obtain the effect.

In the preparation of a body of a foamed or expanded urea-formaldehyde resin according to the present invention an apparatus of the type schematically illustrated in the drawing may be used. The apparatus, which does not form part of this invention, includes two mixers 1, 2, two pressure vessels 3, 4, a mixing nozzle 5 and a belt conveyor 6. Mixer 1 comprises a cylindrical tank provided with a bladed stirrer 7, a bottom outlet valve 8 and a discharge tube 9 connected thereto. The pressure vessel 3 connected to mixer 1 is constructed to withstand a pressure of at least 145 p.s.i.g., and is provided with a bladed stirrer extending through a stuffing box in the cover of the vessel. Also, provided in the cover of the vessel is an inlet pipe 10 for charging the mixture withdrawn from mixer 1. Connected to pressure vessel 3 is a compressed air tube 12 communicating with an air compressor 11, said tube being provided with a control valve 12' and adapted selectively to pressurize said vessel to a positive pressure which can be read on a pressure gauge 13. A discharge conduit 15 connected to the bottom of the pressure vessel 3 and provided with a discharge valve 14, connects the pressure vessel, via a further valve 16, to the mixing nozzle 5. The second mixer 2 and pressure vessel 4 are constructed and equipped in a similar fashion. Thus, mixer 2 is provided with a bladed stirrer 17 and a bottom outlet valve 18 having a discharge tube 19 connected thereto. The pressure vessel 4 is provided with a second inlet pipe 20 and a compressed air tube 21 provided with a control valve 21', and a discharge conduit 24 connecting the pressure vessel 4 with the mixing nozzle 5 via a valve 25. The mixing nozzle 5 comprises a vertically disposed downwardly discharging nozzle tube 26 to the upper end of which the valves 16 and 25 of the conduits 15 and 24, respectively, are connected. The mixing nozzle 5 is of a conventional type and provided with an ejector (not shown) fed by the air compressor to inject air into the finished liquid resinous mixture for its foaming and expansion in the course of its discharge from the mixing nozzle 5. In the experiment described below the foamed mixture was poured directly from the nozzle into box-like moulds instead of on the conveyor belt shown.

SPECIFIC EMBODIMENT OF THE INVENTION

The invention will be described hereinafter with a specific example of the preparation of an incombustible plate of foamed urea-formaldehyde resin according to the inventive method.

EXAMPLE

Mixer 1 was charged with:

Component 1

| | Kg. |
|---|---|
| Urea-formaldehyde precondensate in the form of an aqueous 38 weight percent solution (density=1.1) | 98.7 |
| 50 weight percent sulfite waste liquor (calcium base) | 1.3 |
| | 100.0 |

To this mixture there was added:

| | G. |
|---|---|
| Copper phthalocyanine | 12 | whereupon the mixture was agitated until the copper phthalocyanine had been evenly dispersed in the mixture and the mixture had assumed a homogenously pale blue color.

Mixer 2 was charged with:

Component 2

| | Kg. |
|---|---|
| Phosphoric acid, 85% by weight | 0.9 |
| Mekal X [1] | 2.0 |
| Water | 97.1 |
| | 100.0 |

[1] Trademark for a sulfonation product of vegetable fats, mainly of the palm oil type, marketed by the Badische Anilin- & Soda-Fabrik AG.

The compositions of components 1 and 2 had been calculated so that for the preparation of a foamed product having an apparent density of about 16–17 kg.m.$^3$, 1 part by weight of component 1 should be mixed with 0.75 part by weight of component 2. Since the pouring has to be effected immediately after the mixing of the components to prevent premature gelling and curing, it is necessary to mix the components continuously in a weight proportion of 1:1.75. Subsequently to charging components 1 and 2 into the pressure vessels 3 and 4, these were pressurized to positive pressures which had been determined previously by experiments to correspond to the feeding of the components to the mixing nozzle at a feed rate proportion of 1:0.75. Pressure vessel 1 was charged with 100 kg. of component 1 and vessel 2 with 75 kg. of component 2. The discharge time through the nozzle had been calculated to 15 minutes which means that component 1 should be fed to the nozzle at a rate of 6.7 kg. per minute and component 2 at a rate of 5 kg. per minute. After attaining the required pressures in the pressure vessels the discharge valves 14 and 23 were opened and pressure air admitted to the air ejector in nozzle 5 (not shown) wherein the mixture foamed by the air was ejected through the nozzle and poured into the moulds. The expanding mass immediately started gelling, and after 30 seconds curing began to set in. In the course of the curing process a migration of water started from the interior of the setting mass outwards.

The resulting foamed body had an apparent density of about 16 kg./m.$^3$ (including about 7% moisture).

A combustibility testing of the resulting foamed body was accomplished according to the National Swedish Institute for Materials Testing, Method Br 1. In the testing an electrically heated furnace was used, the furnace chamber of which having the dimensions 22 x 20 x 20 cm. In the top cover of the furnace an aperture, 5 mm. in diameter, was provided for venting air and any combustion gases. Above the aperture an electrically heated platinum spiral was mounted to determine the inflammability of any gases. Also, in the bottom cover of the furnace an aperture, 5 mm. in diameter, was provided as an air intake.

For the testing six test specimens of the dimensions 50 x 40 x 40 mm. were used. Prior to testing, the specimens were conditioned approximately to hygroscopic equilibrium in air having a relative humidity of 65±5% and a temperature of 20±20° C. Prior to each testing the temperature of the furnace chamber was stabilized at 750±2° C. and the platinum spiral at 1050±50° C., which temperatures were maintained in the course of the testing.

After placing the specimen on a support in the center of the furnace chamber the testing was allowed to proceed for 30 minutes during which time the following observations were made continuously:

(a) the temperature above the specimen;
(b) ignition by the platinum spiral;
(c) the difference between the furnace temperature and the temperature in the center of the specimen.

In all of the six tests it was found (a) that the temperature above the specimen did not exceed at any time the furnace temperature by more than 50 degrees centigrade;
(b) that the difference between the furnace temperature and the temperature in the center of the specimen did not exceed 20 degrees centigrade; and
(c) that no combustible gases were evolved from the specimen.

It will thus be seen that the foamed body prepared according to the invention had passed the tests extraordinarily well without showing any sign whatever of evolving combustible gases when subjected to heating at elevated temperatures of the order 750° C.

The coefficient of thermal conductivity of the foamed body was $\lambda=0.027$ kcal.m.h. ° C., i.e., a value manifesting its excellent heat insulating properties.

It will thus be seen that the present invention provides a method for the preparation of foamed bodies based on urea-formaldehde resins wherein the bodies exhibit improved physical properties and durability as compared with foamed urea resins previously known. By the incorporation of copper phthalocyanine it has been rendered possible to impart non-inflammability to the foamed plastic which implies the opening of a wide range of potential uses in cases where foamed urea plastics have not previously been allowed to be used because of their inflammability such as, for instance, as insulation material in freezer storages, in refrigerated cargo-ships, in the building industry, etc.

While a particular embodiment of the invention has been illustrated and described, modifications and changes will become apparent to those skilled in the art, and it is intended to cover in the appended claims all such modifications and changes as come within the spirit and scope of the invention.

What is claimed is:

1. A method of preparing foamed bodies based on urea-formaldehyde resins comprising separately feeding a first component comprising a neutral to alkaline aqueous solution containing about 29 to about 50 weight percent of a precondensation product of urea with formaldehyde having a molar formaldehyde to urea ratio of between 1.8:1 and 2.2:1, about 0.5 to about 1 weight percent of a sulfite waste liquor solids, and about 0.01 to 0.1 percent based on the weight of the urea-formaldehyde precondensate of copper phthalocyanine and a second component comprising an aqueous solutions containing 6 to 15 weight percent of phosphoric, formic or oxalic acids, and 2 to 8 weight percent of a foaming agent selected from the group consisting of alkyl, aryl and alkyl aryl sulfonates, with the proportion between the feed rates of said first and second components being between 2:1 and 1:1, into a confined mixing zone having a nozzle means connected thereto where mixing of the two components occurs, and wherein by injection of compressed air into said confined mixing zone the mixture is foamed and the resulting foam ejected through said nozzle means with expansion of the foam and subsequent setting thereof.

2. A method according to claim 1 wherein said first component comprises an aqueous solution containing 36 weight percent of a urea-formaldehyde precondensate having a molar formaldehyde to urea ratio of 2.1:1, and 13 ml. per liter of the precondensate containing aqueous solution of a 50 percent by weight sulfite waste liquor the base of which being selected from the group consisting of calcium and ammonium, and said second component comprises an aqueous solution containing 7.65 weight percent of 100% phosphoric acid and 2.0 weight percent of a foaming agent consisting of a sulfonation product of vegetable fats, mainly of the palm oil type, said components being mixed continuously in a proportion between the feed rates of said first and second components of 1:0.75.

3. A method according to claim 1 which comprises adding to said first component calcium carbonate in an amount of 1 to 5 percent by weight of said component.

4. A method according to claim 3 which comprises adding to said first component calcium carbonate in an amount of 3 percent by weight of said component.

5. A method according to claim 1 which comprises adding to said first component copper phthalocyanine in an amount of 0.01 to 0.1 percent by weight of said urea-formaldehyde precondensate on a dry basis.

6. A method according to claim 5 which comprises adding to said first component 0.03 percent by weight of copper phthalocyanine.

7. A method according to claim 5 which comprises adding to said first component calcium carbonate in an amount of 1 to 5 percent by weight of said component.

8. A method according to claim 7 which comprises adding to said first component calcium carbonate in an amount of 3 percent by weight of said component.

9. A method of preparing foamed bodies based on urea-formaldehyde resins wherein a first component comprising a neutral to alkaline aqueous solution containing 30 to 50 weight percent of a precondensation product of urea with formaldehyde having a molar formaldehyde to urea ratio of between 1.8:1 and 2.2:1, 10–20 ml. per liter of the precondensate containing aqueous solution of an aqueous solution containing 50 weight percent of a sulfite waste liquor on a dry basis, 1 to 5 percent by weight of calcium carbonate, and copper phthalocyanine in an amount of 0.01 to 0.1 percent by weight of said urea-formaldehyde precondensation product on a dry basis; and a second component comprising an aqueous solution containing 6 to 15 weight percent of phosphoric, formic or oxalic acid and 2 to 8 weight percent of a foaming agent selected from the group consisting of alkyl, aryl and alkyl aryl sulfonates, are fed with the proportion between the feed rates of said first and second components being between 2:1 and 1:1, into a confined mixing zone having a nozzle means connected thereto, where mixing of the two components occurs and wherein by injection of compressed air into said confined mixing zone the mixture is foamed and the resulting foam ejected through said nozzle means with expansion of the foam and subsequent setting thereof.

10. A method according to claim wherein the foam body prepared has an apparent density of from about 4 to about 40 kg. per cubic meter.

References Cited

UNITED STATES PATENTS

| | | | |
|---|---|---|---|
| 3,313,745 | 4/1967 | Klug | 260—2.5 F |
| 3,186,959 | 6/1965 | Shriver, et al. | 260—2.5 F |
| 2,926,722 | 3/1960 | Lauring | 260—2.5 F |
| 3,256,067 | 6/1966 | Shriver et al. | 260—25. F |

JOHN C. BLEUTGE, Primary Examiner

M. FOELAK, Assistant Examiner

U.S. Cl. X.R.

260—2.5 F, 45.75 C, DIG. 24

UNITED STATES PATENT OFFICE
CERTIFICATE OF CORRECTION

Patent No. 3,740,355          Dated June 19, 1973

Inventor(s) W. H. KLUG

It is certified that error appears in the above-identified patent and that said Letters Patent are hereby corrected as shown below:

Column 1, lines 4 and 5, delete: "assignor to PGC Scientifics Corporation, Rockville, Md."

Signed and sealed this 26th day of March 1974.

(SEAL)
Attest:

EDWARD M. FLETCHER, JR.               C. MARSHALL DANN
Attesting Officer                     Commissioner of Patents